(12) United States Patent
Takaku

(10) Patent No.: US 8,479,071 B2
(45) Date of Patent: Jul. 2, 2013

(54) INFORMATION PROCESSING APPARATUS, HISTORY MANAGEMENT METHOD

(75) Inventor: Kazuya Takaku, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1013 days.

(21) Appl. No.: 11/898,369

(22) Filed: Sep. 11, 2007

(65) Prior Publication Data

US 2008/0155369 A1 Jun. 26, 2008

(30) Foreign Application Priority Data

Dec. 22, 2006 (JP) ................................. 2006-346687

(51) Int. Cl.
*H04L 1/00* (2006.01)

(52) U.S. Cl.
USPC .......................................................... 714/746

(58) Field of Classification Search
USPC .......................................................... 714/746
See application file for complete search history.

(56) References Cited

U.S. PATENT DOCUMENTS

| | | | |
|---|---|---|---|
| 5,774,647 A | 6/1998 | Raynham et al. | |
| 5,819,109 A | 10/1998 | Davis | |
| 6,349,357 B1 * | 2/2002 | Chong, Jr. | 711/111 |
| 6,493,656 B1 | 12/2002 | Houston et al. | |
| 6,792,568 B2 * | 9/2004 | Sved | 714/771 |
| 7,017,101 B2 * | 3/2006 | Ando et al. | 714/768 |
| 7,076,767 B1 * | 7/2006 | Williams | 717/127 |
| 2005/0076113 A1 * | 4/2005 | Klotz et al. | 709/224 |

FOREIGN PATENT DOCUMENTS

| | | |
|---|---|---|
| EP | 1 650 657 A2 | 4/2004 |
| JP | 60-074052 | 4/1985 |
| JP | 4-106627 | 4/1992 |
| JP | 06-266584 | 9/1994 |
| JP | 10-040173 | 2/1998 |
| JP | 2000-187621 | 7/2000 |
| JP | 2000-267883 | 9/2000 |
| JP | 2001-109589 | 4/2001 |
| JP | 2005-19668 | 7/2005 |

OTHER PUBLICATIONS

European Search Report dated Jun. 23, 2010 issued in corresponding European Patent Application 07116168.1.
Japanese Office Action dated May 8, 2012 issued in corresponding Japanese Patent Application No. 2006-346687.

* cited by examiner

*Primary Examiner* — Albert Decady
*Assistant Examiner* — Enam Ahmed
(74) *Attorney, Agent, or Firm* — Staas & Halsey LLP

(57) ABSTRACT

An information processing apparatus according to the present invention includes a controller for dividing data into a plurality of divided-data; a plurality of storage units for storing the plurality of divided-data, respectively; a plurality of storage controllers for writing the divided-data into the corresponding storage unit or reading out the divided-data from the respective storage units; a plurality of history storage units for storing histories of the operation of the corresponding storage controllers, respectively; an error detector for detecting an error in the divided-data; an error correction controller for controlling correction of the error; and a plurality of history controller for controlling update of the histories in the corresponding history storage units, respectively upon correction of the error.

8 Claims, 14 Drawing Sheets

FIG. 5

| ENTRY 501 | CMD 502 | Address 503 | DATA 504 | DATA Valid 505 |
|---|---|---|---|---|
| 1982 | ACT | 0000 | 0000000000000000 | 0 |
| 1983 | NOP | 0000 | 0000000000000000 | 0 |
| .... | | | | |
| 1994 | Read | 0400 | 0000000000000000 | 0 |
| 1995 | NOP | 0000 | 0000000000000000 | 0 |
| .... | | | | |
| 2028 | NOP | 0000 | 0123456789abcdef | 1 |
| 2029 | NOP | 0000 | fedcba9876543210 | 1 |
| 2030 | NOP | 0000 | 9876501234abcdef | 1 |
| 2031 | NOP | 0000 | fedcba4321056789 | 1 |
| 2032 | NOP | 0000 | 0000000000000000 | 0 |
| .... | | | | |
| 2046 | NOP | END | 0000000000000000 | 0 |
| 2047 | NOP | 0000 | 0000000000000000 | 0 |

| ENTRY 601 | CMD 602 | Address 603 | DATA 604 | DATA Valid 605 |
|---|---|---|---|---|
| 1995 | ACT | 0400 | 00000000000000000000 | 0 |
| 1996 | NOP | 0000 | 00000000000000000000 | 0 |
| .... | | | | |
| 2007 | Read | 0400 | 00000000000000000000 | 0 |
| 2008 | NOP | 0000 | 00000000000000000000 | 0 |
| .... | | | | |
| 2041 | NOP | 0000 | 0123456789abcdef | 1 |
| 2042 | NOP | 0000 | fedcba9876543210 | 1 |
| 2043 | NOP | 0000 | 9876501234abcdef | 1 |
| 2044 | NOP | 0000 | fedcba4321056789 | 1 |
| 2045 | NOP | 0000 | 00000000000000000000 | 0 |
| 2046 | NOP | END | 00000000000000000000 | 0 |
| 2047 | NOP | 0000 | 00000000000000000000 | 0 |

FIG. 13

| ENTRY (1301) | CMD (1302) | Address (1303) | DATA (1304) | DATA Valid (1305) |
|---|---|---|---|---|
| 1977 | ACT | 0020 | 0000000000000000 | 0 |
| 1978 | NOP | 0000 | 0000000000000000 | 0 |
| .... | | | | |
| 1989 | Read | 0401 | 0000000000000000 | 0 |
| 1990 | NOP | 0000 | 0000000000000000 | 0 |
| .... | | | | |
| 2023 | NOP | 0000 | 0000000000000000 | 0 |
| 2024 | NOP | 0000 | 0123456789abcdef | 1 |
| 2025 | NOP | 0000 | fedcba9876543210 | 1 |
| 2026 | NOP | 0000 | 9876501234abcdef | 1 |
| 2027 | NOP | 0000 | fedcba9876543210 | 1 |
| 2028 | NOP | 0000 | 0123456789abcdef | 1 |
| 2029 | NOP | 0000 | fedcba9876543210 | 1 |
| 2030 | NOP | 0000 | 9876501234abcdef | 1 |
| 2031 | NOP | 0000 | fedcba4321056789 | 1 |
| 2032 | NOP | 0000 | 0000000000000000 | 0 |
| .... | | | | |
| 2046 | NOP | END | 0000000000000000 | 0 |
| 2047 | NOP | 0000 | 0000000000000000 | 0 |

| ENTRY | CMD | Address | DATA | DATA Valid |
|---|---|---|---|---|
| 0985 | ACT | 0020 | 0000000000000000 | 0 |
| 0986 | NOP | 0000 | 0000000000000000 | 0 |
| .... | | | | |
| 0997 | Read | 0401 | 0000000000000000 | 0 |
| 0998 | NOP | 0000 | 0000000000000000 | 0 |
| 1031 | NOP | 0000 | 0000000000000000 | 0 |
| 1032 | NOP | 0000 | 0123456789abcdef | 1 |
| 1033 | NOP | 0000 | fedcba9876543210 | 1 |
| 1034 | NOP | 0000 | 9876501234abcdef | 1 |
| 1035 | NOP | 0000 | fedcba4321056789 | 1 |
| 1036 | NOP | 0000 | 0123456789abcdef | 1 |
| 1037 | NOP | 0000 | fedcba9876543210 | 1 |
| 1038 | NOP | 0000 | 9876501234abcdef | 1 |
| 1039 | NOP | 0000 | fedcba4321056789 | 1 |
| 1040 | NOP | 0000 | 0000000000000000 | 0 |
| .... | | | | |
| 2046 | NOP | END | 0000000000000000 | 0 |
| 2047 | NOP | 0000 | 0000000000000000 | 0 |

1400

1401 1402 1403 1404 1405

INFORMATION PROCESSING APPARATUS, HISTORY MANAGEMENT METHOD

BACKGROUND OF THE INVENTION

1. Field of the Invention

The present disclosure relates to error analysis in an information processing apparatus that stops recording a processing history when an error occurs.

2. Description of the Related Art

An error may occur in a server that synchronously processes memory controllers that assign data to multiple memories and control the memories. The memory controllers record an operational history of data processing and data to be processed in history memories (a set of the operational history and data is called log, hereinafter), as error analysis means. Then, when an error occurs, the memory controller having the error stops recording the log. A user of the server can analyze the error by referring to the log upon occurrence of the error.

However, the error, which can be analyzed by only using the log in the memory controller having the error, is limited to an extremely simple error, and all errors are not addressable currently.

Performing more detail error analysis may require a log in another memory controller, which performs data processing synchronously, such as a log on data processing without an error to be compared. However, in order to reduce the memory capacity, a history memory is configured to delete old logs sequentially and overwrite a new log when the amount of the stored logs is equal to or larger than the capacity. Furthermore, recording a log on data processing without an error is not stopped. Therefore, a server cannot properly obtain a log of the memory controller without an error to be compared.

An integrated circuit disclosed in Japanese Unexamined Patent Application Publication No. 6-266584 includes an access trace memory that captures input data and deletes old data and holds data before a predetermined cycle from the latest data, and a memory control section that stops processing of updating the access trace memory when an abnormality occurs.

However, a server can only stop recording a log on data processing without an error and cannot perform sufficient error analysis by comparing logs.

SUMMARY OF THE INVENTION

The object of the present disclosure is to correct a so-called uncorrectable error (called UE, hereinafter) such as double errors occurring in an information processing apparatus that synchronously processes memory controllers that assign data to multiple memories and control the memories.

According to one aspect of the present disclosure, an information processing apparatus according to the present disclosure that performs processing of writing or reading data and manages the history of the processing includes control means for dividing the data into multiple divided data pieces, multiple storage means for storing the multiple divided data pieces, which are divided by the control means, multiple storage control means respectively corresponding to the multiple storage means for performing processing of writing the divided data pieces to the respective storage means or reading the divided data pieces from the respective storage means, multiple history storage means for storing histories of the processing performed by the respective storage control means, error detecting means for detecting an error in the processing in the storage control means, error correction signal generating means for generating an error correction signal indicating that the error detected by the error detecting means is to be corrected, and multiple history stop means respectively corresponding to the history storage means for stopping storing histories by the respective history storage means based on the error correction signal.

BRIEF DESCRIPTION OF THE DRAWINGS

FIG. 5 shows a recording log on data processing (called a history table, hereinafter) 500 of one embodiment.

FIG. 6 shows a history table 600 of one embodiment.

FIG. 13 shows a history table 1300 of one embodiment.

FIG. 14 shows a history table 1400 of one embodiment.

DESCRIPTION OF THE PREFERRED EMBODIMENTS

[1st Embodiment]

Figure 1:
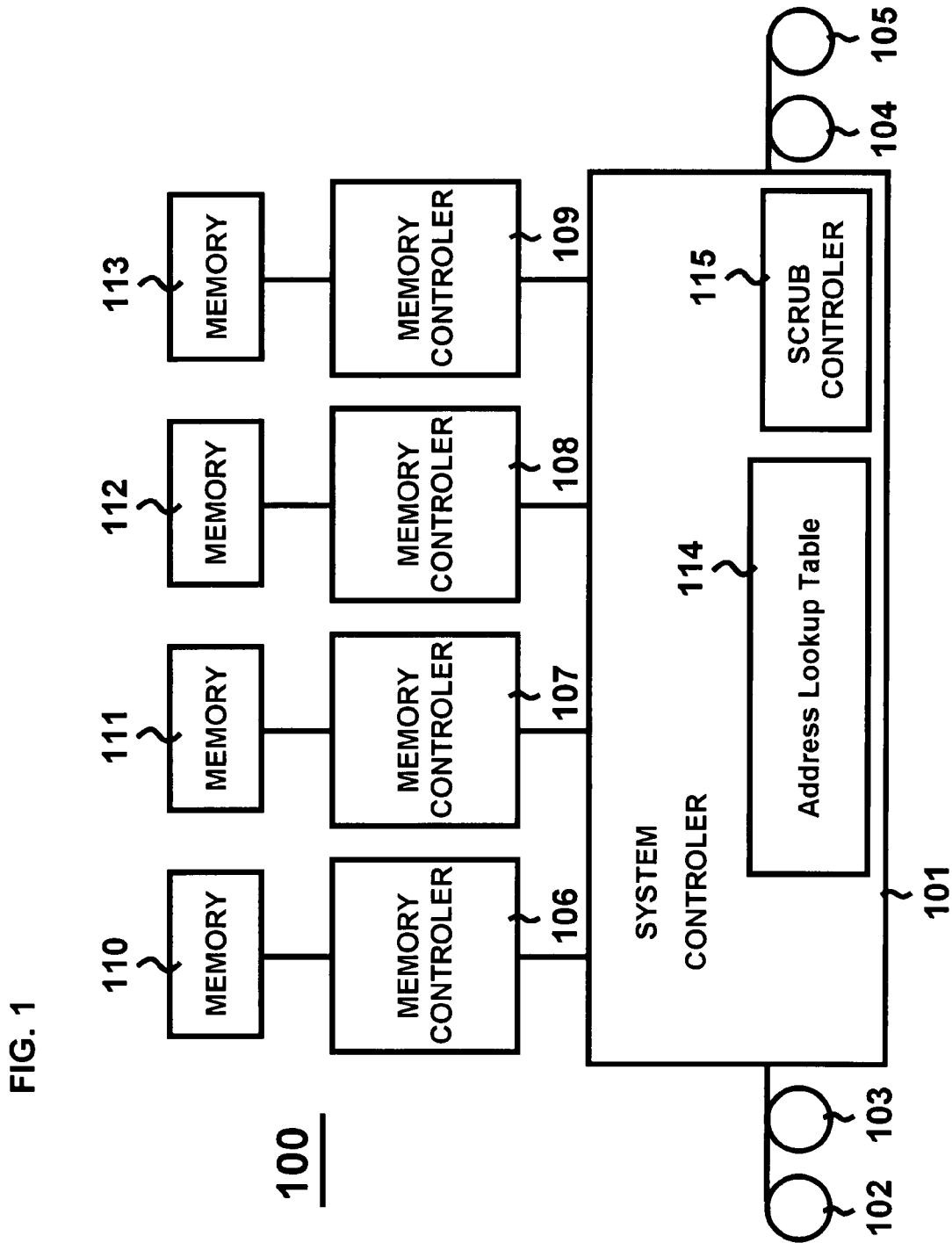
FIG. 1 shows a schematic diagram of a server 100 in a Non-Mirror mode of one embodiment of the present invention.

FIG. 1 shows a conceptual diagram of an information processing apparatus 100 of one embodiment. This embodiment describes a Non-Mirror mode.

[Conceptual Diagram of Server 100]

The information processing generally represents an apparatus that performs data processing, such as a server and a personal computer. The information processing apparatus in this embodiment will be called server, hereinafter.

The server 100 includes a system controller 101, CPUs (central processing units) 102, 103, 104 and 105, memory controllers 106, 107, 108 and 109 and memories 110, 111, 112 and 113. The server 100 operates in a Non-Mirror mode. The Non-Mirror mode is a mode that handles the memories 110, 111, 112 and 113 as one cache line and synchronously controls the memories 110, 111, 112 and 113. In this embodiment data 116 is divided into divided data pieces 117, 118, 119 and 120. Then, the memories 110, 111, 112 and 113 store the divided data pieces 117, 118, 119 and 120, respectively.

[System Controller]

The system controller 101 centrally controls commands received from the CPUs 102, 103, 104 and 105. The system controller 101 synchronously controls the memory controllers 106, 107, 108 and 109 based on commands from the CPUs 102, 103, 104 and 105.

The memory controllers 106, 107, 108 and 109 synchronously perform memory access to the memories 110, 111, 112 and 113 to write or read data.

The system controller 101 has an address lookup table 114. The data transferred from any of CPUs 102, 103, 104 and 105 have address in all memory areas. The system controller 101 uses the address lookup table 114 to assign the address of the data transferred from the CPUs 102, 103, 104 and 105 to any of the memory controllers 106, 107, 108 and 109 and converts the assigned address to the address in the memory access in the corresponding memory controllers 106, 107, 108 and 109. The system controller 101 transfers the addresses in the memories 110, 111, 112 and 113 to the memory controllers 106, 107, 108 and 109.

The system controller 101 transfers the converted addresses to the corresponding memory controllers 106, 107, 108 and 109 respectively as address packets separately from corresponding data. The data and address packets have respective IDs and have correspondences therebetween. The memory controllers 106, 107, 108 and 109 receive the data and address packets respectively and then determine whether the data and address packets correspond to each other or not based on the IDs that the data and address packets have.

Figure 4:
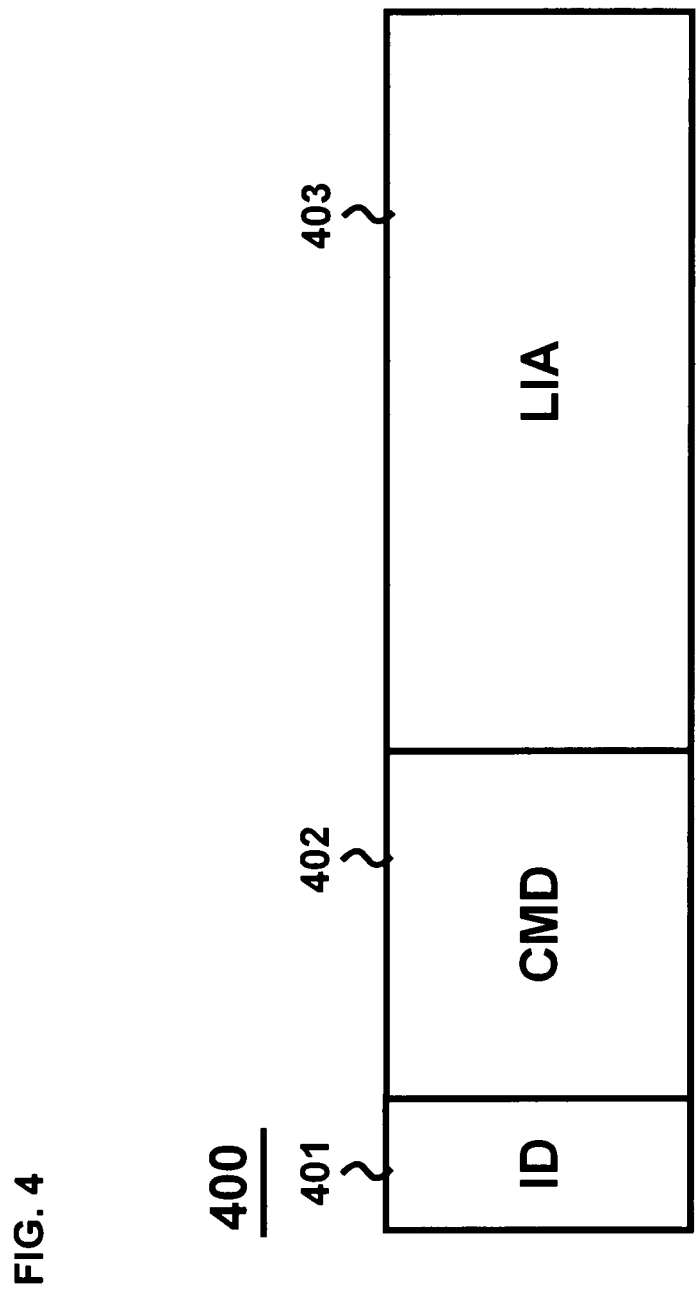
FIG. 4 shows an address packet 400 of one embodiment.

FIG. 4 shows an address packet 400 according to this embodiment. The address packet 400 includes an ID 401, a CMD (command) 402 and a LIA (LDX Interface Address) 403. The ID 401 is information having a correspondence with data. The CMD 402 is information describing a memory access command in any of the memories 110, 111, 112 and 113. The LIA 403 is information indicating the address any of the memories 110, 111, 112 and 113 in the respective memory controllers 106, 107, 108 and 109.

The system controller 101 has a scrub controller 115. The scrub controller 115 is a control unit that, when a memory read error occurs in at least any one of the memory controller 106, 107, 108 or 109, commands any of the memory controllers 106, 107, 108 and 109 to perform an operation of correcting and rewriting after reading (called scrub-write, hereinafter) on the memory address having the error.

[Memory Controllers]

Figure 2:
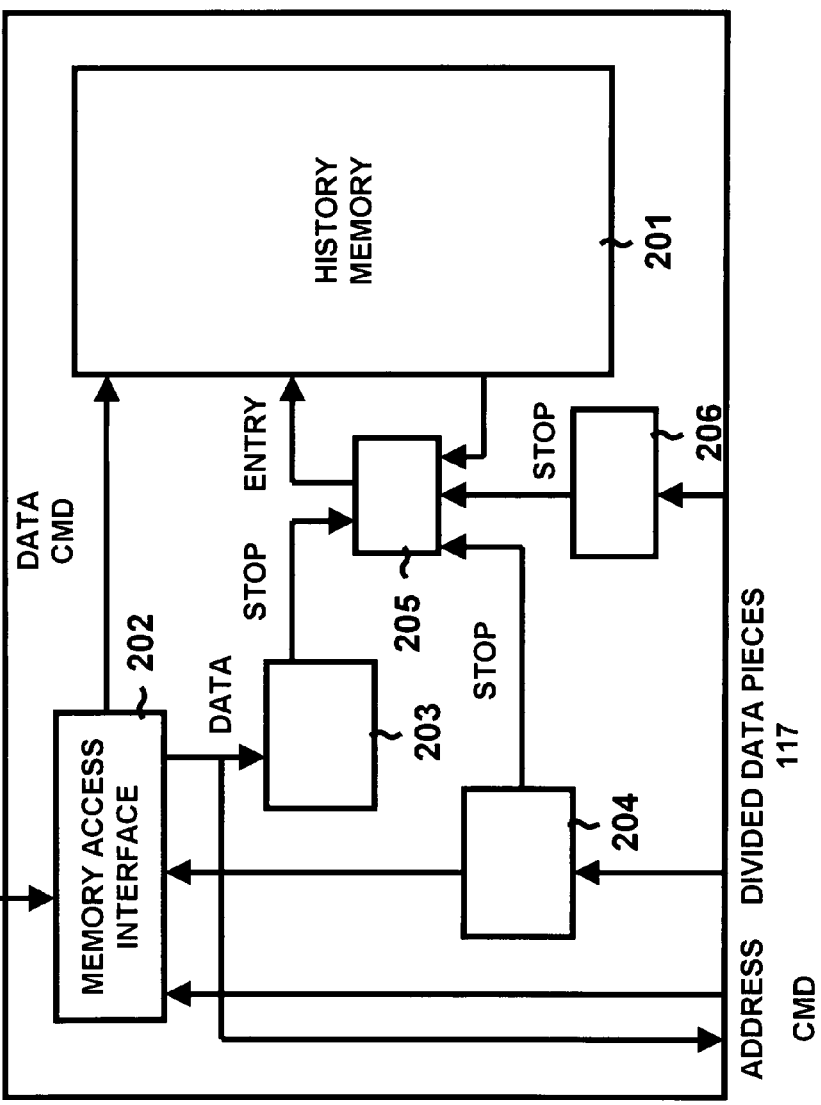
FIG. 2 shows a schematic diagram of a memory controller 106 of one embodiment.

FIG. 2 shows a schematic diagram of the memory controller 106 according to this embodiment. The memory controllers 107, 108 and 109 also have the same construction as that of the memory controller 106 respectively. The memory controllers 106, 107, 108 and 109 are processing units that synchronously perform memory access to the corresponding memories 110, 111, 112 and 113 to perform data writing or reading respectively. The memory controllers 106, 107, 108 and 109 increase the speed of access to the corresponding memories 110, 111, 112 and 113 respectively in the entire server 100.

Then, the memory controller 106 controls data writing to the memory 110 and data reading from the memory 110.

The memory controller 106 includes a history memory 201, a memory access interface 202, error detecting circuits 203 and 204, an address controller 205, and a history stop circuit 206.

The memory access interface 202 writes data to the memory 110 and reads data from the memory 110. The memory access interface 202 further records "data to be written to the memory 110 or read from the memory 110 by the memory access interface 202" and a "history of writing and reading processing". In this embodiment, the "history of writing and reading processing" is a time interval when the memory access interface 202 performs writing control or reading control and an address of data subject to the writing control or reading control.

FIG. 5 shows a history table 500. The history table 500 has items of "ENTRY 501", "CMD 502", "ADDRESS 503", "DATA 504" and "DATA Valid 505".

The "ENTRY 501" is a "time interval of accesses when the memory access interface 202 performs memory access control". The "CMD 502" is a "type of a memory access command". The "ADDRESS 503" is an "address where the memory access interface 202 performs memory access control". The "DATA 504" is "data to write in the memory 110 or to read from the memory 110 by the memory access interface 202". The "DATA Valid 505" is a "flag indicating that the memory access interface 202 has performed control over data writing to the memory 110 or control over data reading from the memory 110".

Similarly, FIG. 6 shows a history table 600. The "ENTRY 601" is a "time interval of accesses when the memory access interface 202 performs memory access control". The "CMD 602" is a "type of a memory access command". The "ADDRESS 603" is an "address where the memory access interface 202 performs memory access control". The "DATA 604" is "data to write in the memory 110 or to read from the memory 110 by the memory access interface 202". The "DATA Valid 605" is a "flag indicating that the memory access interface 202 has performed control over data writing to the memory 110 or control over data reading from the memory 110".

When the amounts of the history tables 500 and 600 are equal to or larger than the capacity of the history memory 201, the history memory 201 is configured to delete an old history and overwrite a new history.

FIG. 5 shows the history table 500 when the error detecting circuit 203 or 204 detects an error. When the error detecting circuit 203 or 204 detects an error, updating the history memory 201 stops after a predetermined period of time from the time when the error is detected. This is because a certain error propagation time is required from the detection of an error by the error detecting circuit 203 or 204 to the receipt of a signal for stopping updating the history memory 201. The access by which an error is detected can be identified from the history of stopping updating the history memory 201.

FIG. 6 shows a history table 600 when the error detecting circuits 203 and 204 detect no error. While the error detecting circuits 203 and 204 are detecting no error, the address controller 205 is updating a history. Updating the history memory 201 temporarily stops when a user refers to the history table 600.

The error detecting circuit 203 is a circuit that detects an error when the memory access interface 202 read data from the memory 110. The error detecting circuit 204 is a circuit that detects an error when data is written to the memory 110. Each of the error detecting circuits 203 and 204 may be an S4EC-D4ED circuit, for embodiment. The S4EC-D4ED circuit is a circuit that performs 4-bit single block error correction and 4-bit double block error detection. An error may be an error such as a correctable error (called CE, hereinafter) and an uncorrectable error (UE). The UE may be a double block error, for embodiment. The double block error is an error having a bit error across two blocks within data. In order to generally correct an error across N bits present in data, the minimum distance between codes requires 2N+1 or longer. The minimum distance between codes in the error detecting circuits 203 and 204 according to this embodiment is 2N+1, and the error detecting circuits 203 and 204 are circuits that can correct errors of N bits or smaller.

When the error detecting circuit 203 detects an error in data read from the memory 110, the error detecting circuit 203 transmits an error detection signal to the address controller 205. The address controller 205 receives the error detection signal from the error detecting circuit 203 and stops updating of an address upon memory access, of a command upon memory access and of data upon memory access, which are written in the history memory 201 from the memory access interface and a time interval of memory accesses, which is recorded therealong. When the error detecting circuit 204 detects an error in data to be written to the memory 110, the error detecting circuit 204 transmits an error detection signal to the address controller 205.

The address controller 205 receives the error detection signal from the error detecting circuit 204 and then stops recording a log on memory accesses to the history memory 201, which is performed by the memory controller 106. The log here is "ENTRY", "CMD", "Address", "DATA" or "DATA Valid".

[Address Controller 205 and History Stop Circuit 206]

The address controller 205 has a function of creating an address of the history memory 201 when a history of memory accesses transmitted from the memory access interface is recorded in the history memory 201 and the address controller 205 has a function of controlling the history memory 201. When the error detecting circuit 203 detects a memory read error, the error detecting circuit 203 requests scrub write processing to the system controller 101. In other words, when the error detecting circuit 203 detects an error in data reading from the memory 110, the error detecting circuit 203 performs data reading from the same address as the address of the data from which an error has been detected again and commissions the system controller 101 to request an operation of rewriting after correction on the data. The error detecting circuit 203 here requests the system controller 101 through the history stop circuit 206. The history stop circuit 206 receives a scrub write command signal from the system controller 101 and transmits the scrub write command signal to the address controller 205. The address controller 205 receives the scrub write command signal and then controls to stop updating the history memory 205. The system controller 101 synchronously transmits the scrub write command signal to the history stop circuit of the other memory controllers 107, 108 and 109. The synchronous transmission of the scrub write command signal means the simultaneous transmission of the scrub write command signal to the memory controllers 106, 107, 108 and 109. The respective history stop circuits of the corresponding memory controllers 106, 107, 108 and 109 receive the scrub write command signal and then stop processing of updating the corresponding history memories through the address controller. The memory controllers 106, 107, 108 and 109 can prevent updating processing histories of the history memories that they have. Thus, upon occurrence of an error in a memory access, the histories in the history memories of all of the memory controllers 106, 107, 108 and 109 can be referred, and the error can be analyzed in detail.

The memory 110 stores data and is controlled by the memory controller 106. In a similar way, The memories 111, 112 and 113 store data and are controlled by the memory controllers 107, 108 and 109 respectively.

[Specific Embodiment in which Data of 128 Bytes is Written in Memory]

Next, stopping updating the history memory 201 upon occurrence of an error will be described with reference to an embodiment in which data to be stored in the CPUs 102, 103, 104 and 105 is 128 bytes.

Figure 3:
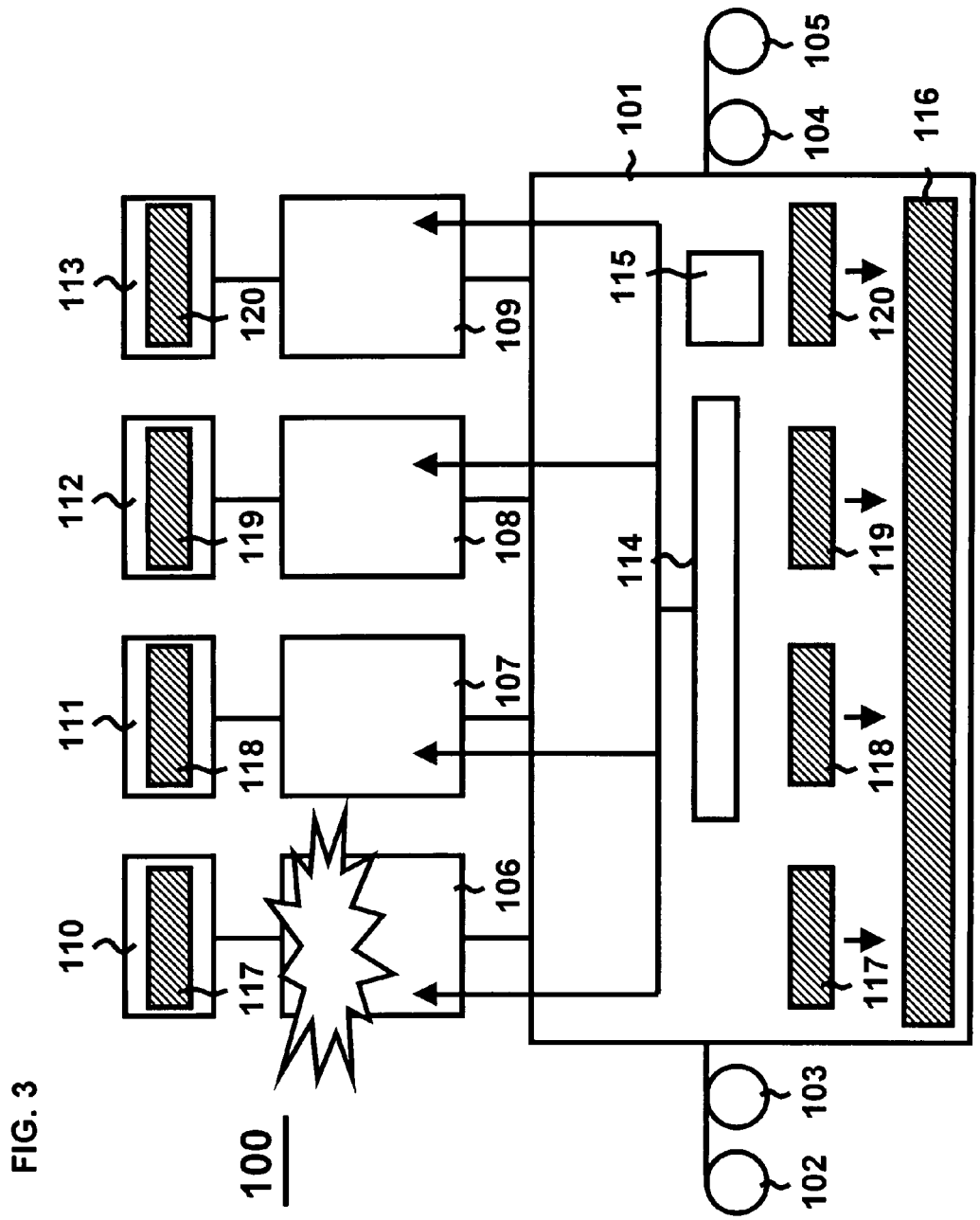
FIG. 3 shows a schematic diagram of the server 100 having an error of one embodiment.

FIG. 3 shows a schematic diagram of the server 100 having an error in the memory controller 106.

Each of the cache memories of the CPUs 102, 103, 104 and 105 can store data of 128 bytes respectively. The cache memory of the CPU 102 stores data of 128 bytes. The cache memory is a storage device internally provided in the CPU 102. Storing data to be used highly frequently by the CPU 102 can reduce accesses to the memories 110, 111, 112 and 113, which can increase the speed of processing.

In order to store data of 128 bytes from the memories 110, 111, 112 and 113 to the cache memory, the CPU 102 accesses the system controller 101 to read the memories.

The CPU 102 accesses the system controller 101 at an address PA indicating all areas of many memory systems provided on the system.

The system controller 101 uses the address lookup table 114 to convert the address PA to an address MA on the memory 110, which can be used by the memory controller 106 to memory access.

The system controller 101 further converts the address PA to the MA and LIA by adding selection information on memories such that a memory can be selected from many memories (not shown) connected to the memory controller 106.

The data of 128 bytes in the cache memory here is divided into divided data pieces 117, 118, 119 and 120 of 32 bytes each. The memories 110, 111, 112 and 113 store the divided data pieces 117, 118, 119 and 120, respectively. The system controller 101 synchronously controls the four memory controllers 110, 111, 112 and 113, and the memory controllers 106, 107, 108 and 109 synchronously access the memories 106, 107, 108 and 109 respectively. Since the system controller 101 is a controller that controls memory access from any of the CPUs 102, 103, 104 and 105, it is more efficient to synchronously control commands to the memory controllers 106, 107, 108 and 109 and data exchange by one memory access. Thus, the speed of the processing can be increased.

The system controller 101 converts the respective addresses of the corresponding divided data pieces 117, 118, 119 and 120 of 32 bytes each in the storage section of the system controller 101 to corresponding addresses in the memory controllers 106, 107, 108 and 109. The system controller 101 performs the address conversion on the divided data pieces 117, 118, 119 and 120 with reference to the address lookup table 114.

Figure 7:
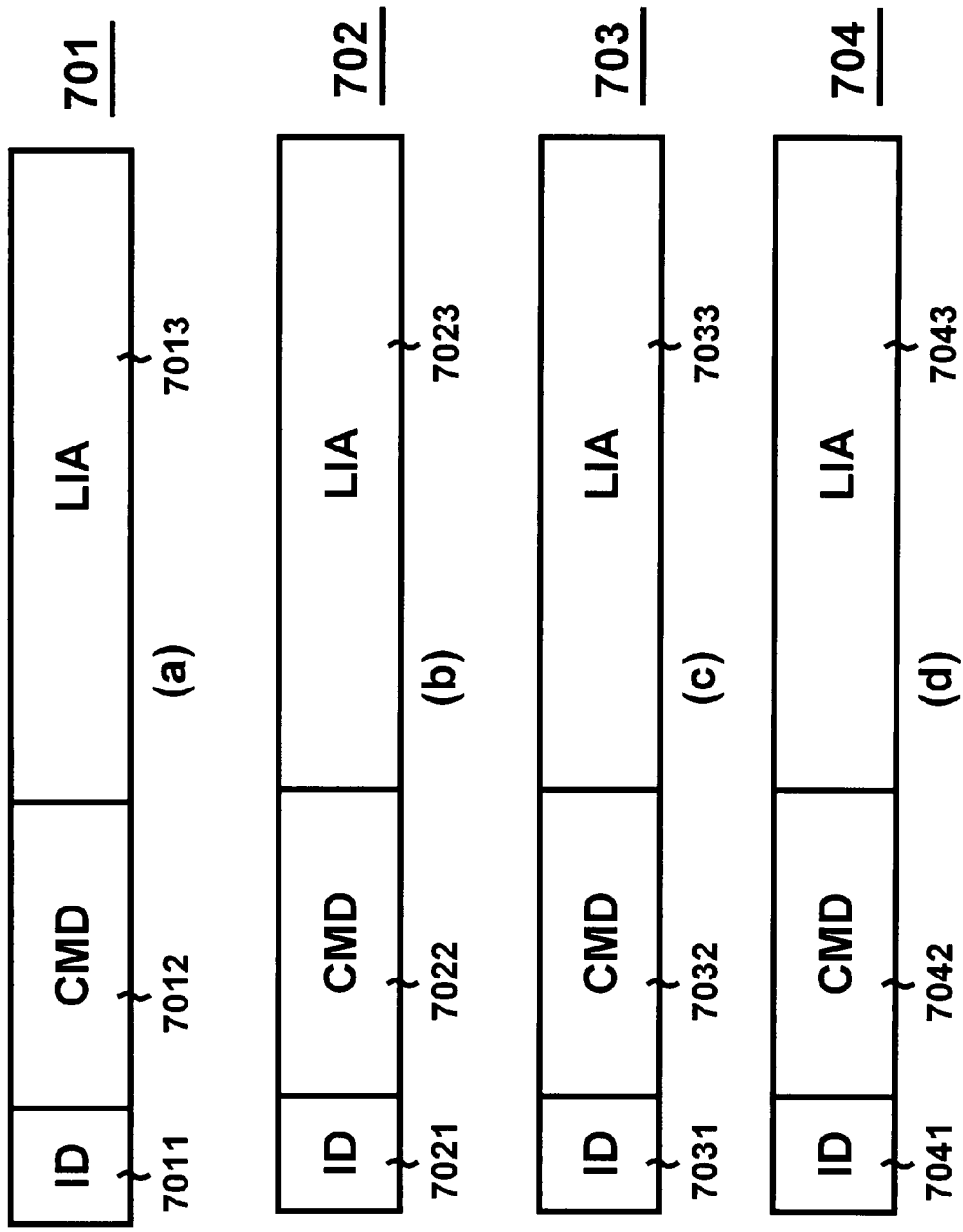
FIG. 7 shows an address packet of one embodiment.

FIG. 7 shows an address packet of the present embodiment. An address packet 701 is transmitted from the system controller 101 to the memory controller 106. An address packet 702 is transmitted from the system controller 101 to the memory controller 107. An address packet 703 is transmitted from the system controller 101 to the memory controller 108. An address packet 704 is transmitted to the memory controller 109. The address packet 701 includes an ID 7011, a CMD 7012 and a LIA 7013. The address packet 702 includes an ID 7021, a CMD 7022 and a LIA 7023. The address packet 703 includes an ID 7031, a CMD 7032 and a LIA 7033. The address packet 704 includes an ID 7041, a CMD 7042 and a LIA 7043. The ID 7011 is information by which the memory controller 106 manages a read request. Similarly, the ID 7021 is information by which the memory controller 107 manages a read request. The ID 7031 is information by which the memory controller 108 manages a read request. The ID 7041 is information by which the memory controller 109 manages a read request. The CMD 7012 is information describing a memory access command in the memory 110. Similarly, the CMD 7022 is information describing a memory access command in the memory 111. The CMD 7032 is information describing a memory access command in the memory 112. The CMD 7042 is information describing a memory access command in the memory 113. The LIA 7013 is information describing an address of a memory access in the memory controller 106. Similarly, the LIA 7023 is information describing an address of a memory access in the memory controller 107. The LIA 7033 is information describing an address of a memory access in the memory controller 119.

The LIA 7043 is information describing an address of a memory access in the memory controller 109.

The system controller 101 transfers the address packet 701 to the memory access interface 202. The system controller 1010 also transfers the address packet to the memory access interface.

The memory access interface 202 receives the address packet 701 and then extracts the MA from the LIA 7013 within the packet and obtains the divided data piece 117 from the memory 110 based on the extracted MA.

The memory controller 106 determines the presence of an error in the divided data piece 117 by the error detecting circuit 203. Similarly, the memory controllers 107, 108 and 109 determine the presence of an error in the divided data pieces 118, 119 and 120 received by them by the respective error detecting circuits.

In the memory controller 106, the memory access interface 202 records in the history memory 201 an "ENTRY" describing a "time interval of memory accesses", a "CMD" describing a "command upon memory access", the "LIA 7013" and "divided data piece 117", and a "DATA Valid" describing a "flag indicating that the memory access interface 202 has performed control over data writing to the memory 110 or control over data reading from the memory 110". Similarly, the memory access interface in the respective memory controllers 107, 108 and 109 records in the respective history memory 201 an "ENTRY" describing a time interval of memory accesses, a "CMD" describing a command for memory access, an "address" describing the LIA involving the memory access address, "DATA", which is read data, and a "DATA Valid" describing a flag indicating that the memory access interface has performed control over data writing to the memory or control over data reading from the memory.

In the memory controller 106, when the error detecting circuit 203 detects an error in the divided data piece 117, the error detecting circuit 203 transmits the error detection signal as a history memory stop signal to the address controller 205. The address controller 205 stops recording to the history memory 201 by the error detection signal where the history memory 201 is continuously recording the "memory access time interval", "command upon memory access", "LIA 7013" and "divided data piece 117".

Then, the address controller 205 receives the error detection signal and then transmits scrub write request commissioning information in a packet form to the system controller 101 through the history stop circuit 206. The scrub write request commissioning information is information describing the commission for requesting processing of rewriting after error correction.

The system controller 101 receives the scrub write request commissioning information and then uses the scrub controller 115 to synchronously transmit the scrub write command to the memory controllers 106, 107, 108 and 109. The memory controllers 106, 107, 108 and 109 receive the scrub write command as a recording stop signal for the history memories 201 by the respective history stop circuits. When the scrub write command is received, the history stop circuits stop the processing of updating the history memories through the address controllers.

The memory controllers 106, 107, 108 and 109 can prevent updating of processing histories in the respective history memories. Thus, the server 100 can refer to the data of 128 bytes upon occurrence of an error from the history memories of the memory controllers 106, 107, 108 and 109 and can analyze the error in detail.

[Flowchart of Stopping Updating History]

Figure 8:
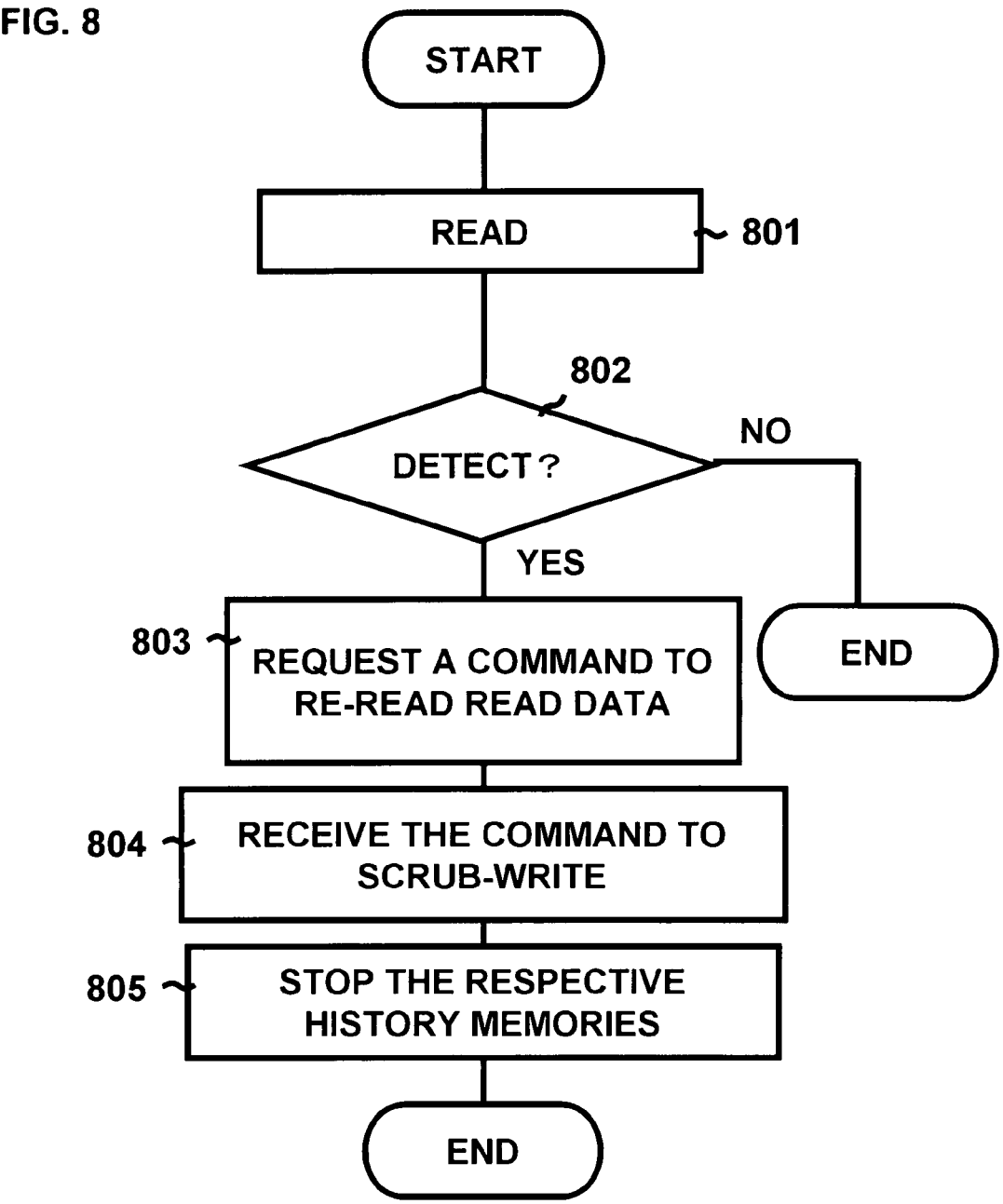
FIG. 8 shows a flowchart for stopping the history memory 201 of one embodiment.

FIG. 8 shows a flowchart of a process of stopping the history memory 201 in this embodiment.

The memory interface 202 reads a divided data piece from the memory 110 based on the command from the system controller 101 (step S801). The memory access interface 202 transfers the read divided data piece to the error detecting circuit 203.

The error detecting circuit 203 determines the presence of an error in the divided data piece 203 (step S802). The presence of an error is determined by a comparison operation between data to be detected with regard to an error and check bits coded as redundant data, like an ECC circuit such as the S4EC-D4ED.

If the error detecting circuit 203 detects no error (step S802: NO), the processing of error detection ends. If the error detecting circuit 203 detects an error (step S802: YES), the error detecting circuit 203 stops the history memory within the memory controller thereof through the address controller 205 and requests the system controller 101 a command to re-read read data (step S803). The system controller 101 transmits the command to scrub write a divided data piece synchronously with all of the memory controllers 106, 107, 108 and 109. The memory controllers 106, 107, 108 and 109 receive the command to scrub-write a divided data piece (step S804) and stop the respective history memories based on the received command to re-read (step S805).

According to the present embodiment, in an information processing apparatus that synchronously processes memory controllers that assign data to multiple memories and control the memories, the log recording on data processing without an error is also stopped by using a synchronization signal due to a UE, and the UE can be corrected by using the log.

[2nd Embodiment]

Figure 9:
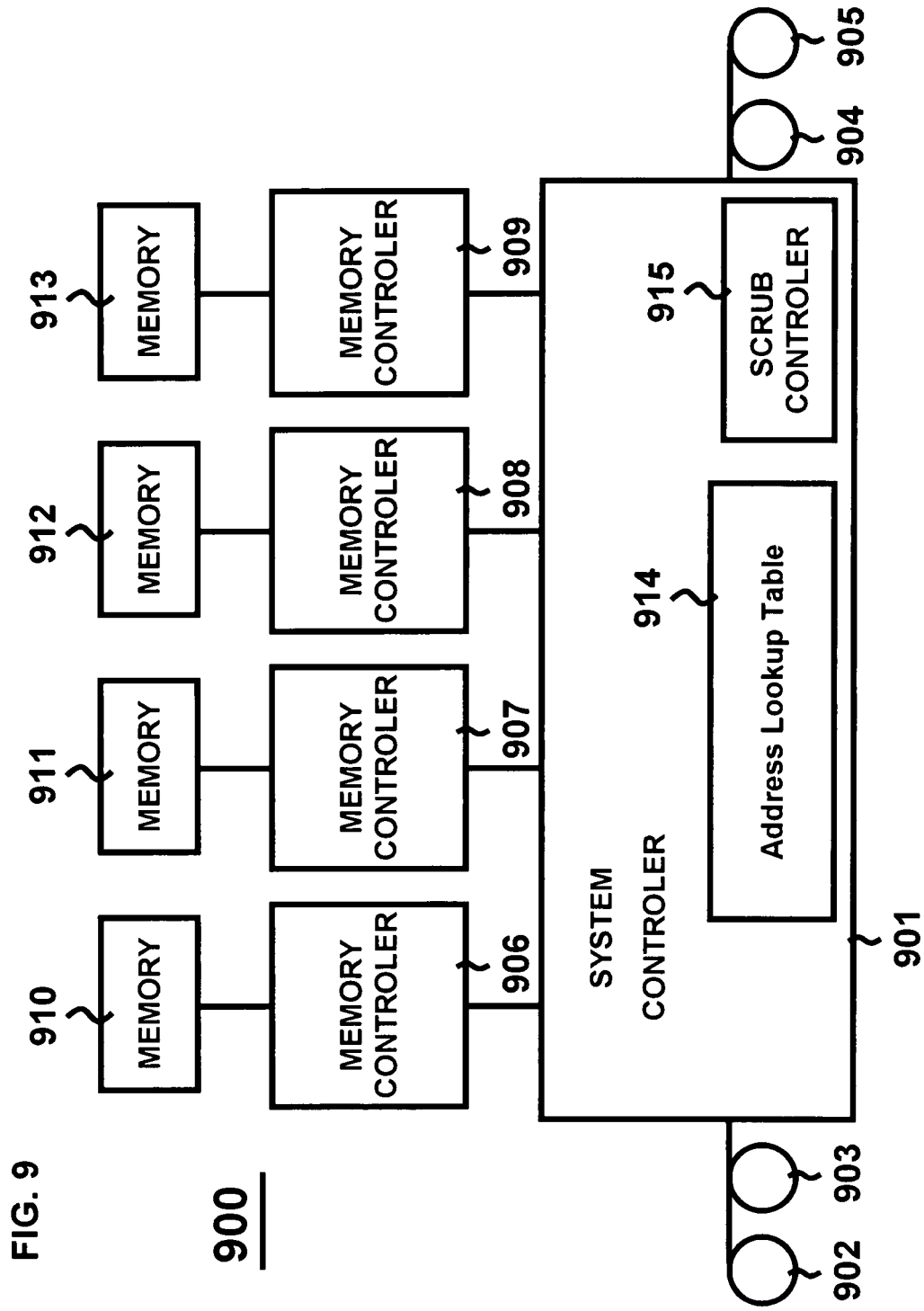
FIG. 9 shows a schematic diagram of a server 900 in a Mirror mode of one embodiment.

FIG. 9 shows a conceptual diagram of a server 900 according to this embodiment. 2nd embodiment describes a Mirror mode.

[Conceptual Diagram of Server 900]

The server 900 includes a system controller 901, CPUs (central processing units) 902, 903, 904 and 905, memory controllers 906, 907, 908 and 909 and memories 910, 911, 912 and 913. The server 900 operates in a Mirror mode. The Mirror mode is a mode that stores identical data in a pair of the memories 910 and 911 and a pair of 912 and 913 and synchronously controls the memories 910, 911, 912 and 913. In this embodiment, data 916 and data 917 are data having an identical description. A divided data piece 918 stored in the memory 910 and a divided data piece 920 stored in the memory 912 are divided data pieces having an identical description. Similarly, a divided data piece 919 stored in the memory 911 and a divided data piece 921 stored in the memory 913 are divided data pieces having an identical description.

Figure 10:
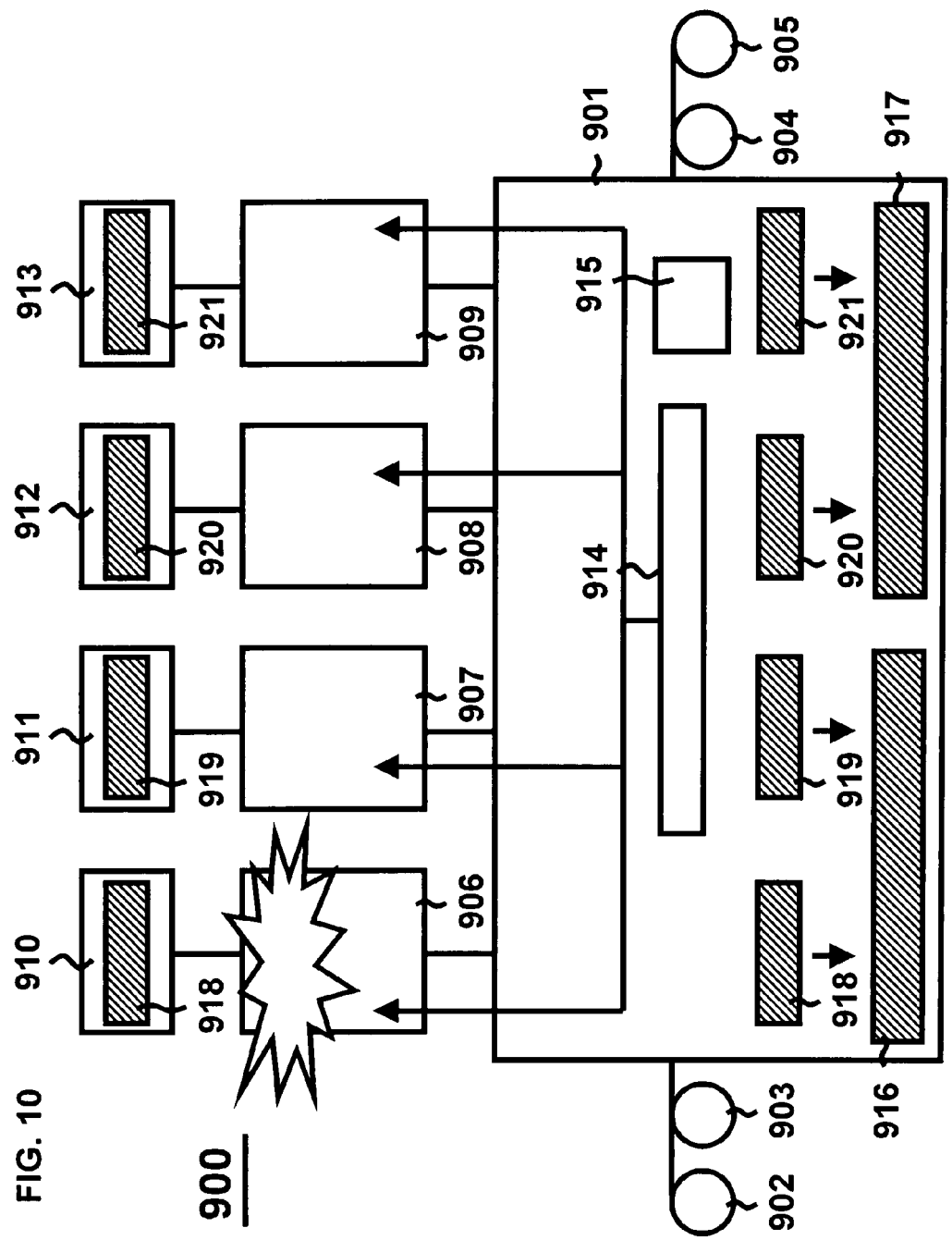
FIG. 10 shows a schematic diagram of the server 100 having an error of one embodiment.
Figure 11:
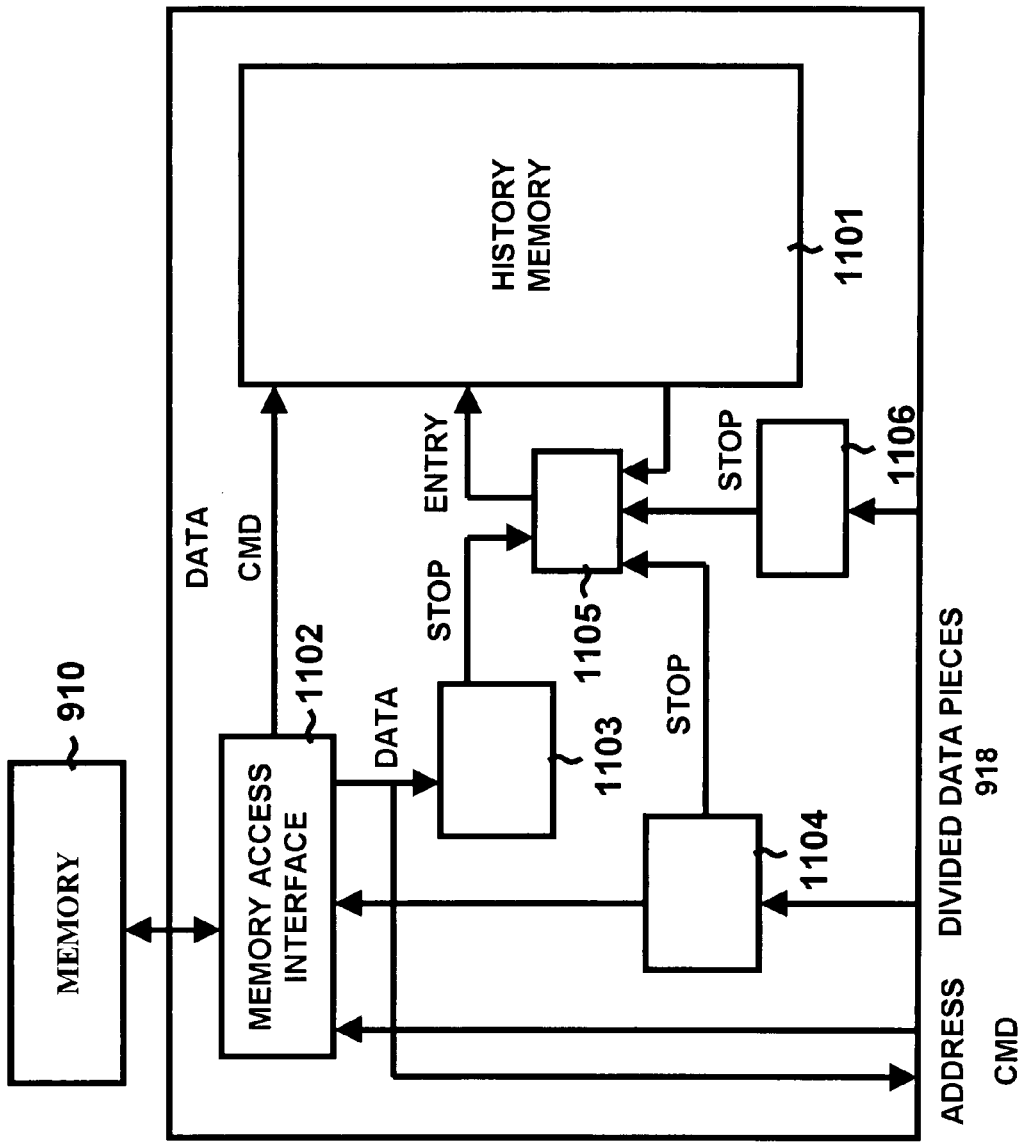
FIG. 11 shows a schematic diagram of a memory controller 906 of one embodiment.
Figure 12:
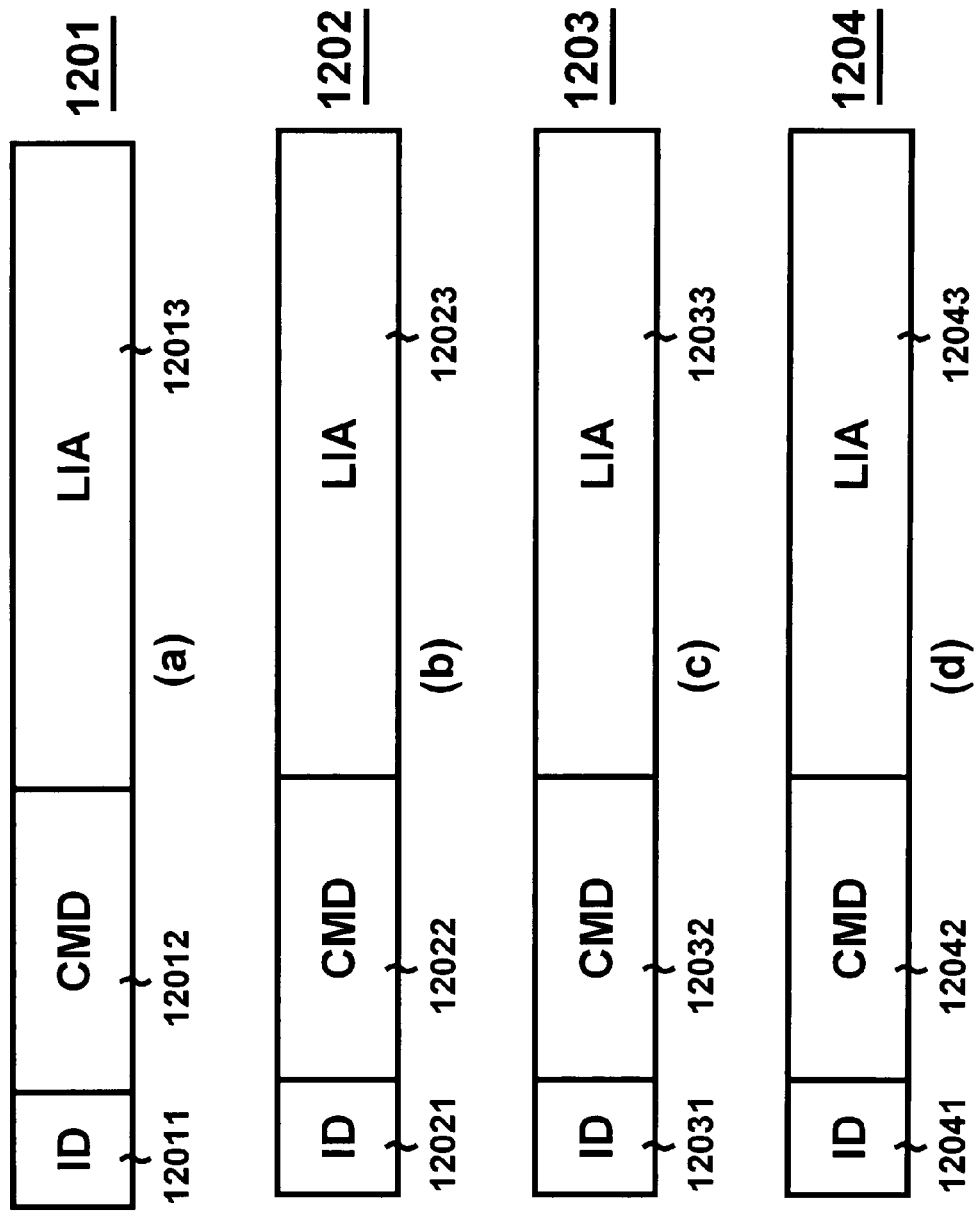
FIG. 12 shows address packets of one embodiment.

FIG. 10 shows a schematic diagram of the server 900 where an error occurs in the memory controller 906.

Each of the cache memories of the CPUs 902, 903, 904 and 905 can store data of 128 bytes. The cache memory of the CPU 902 stores data of 128 bytes. The cache memory is a storage device internally provided in the CPU 902. Storing data to be used highly frequently by the CPU 902 can reduce accesses to the memories 910, 911, 912 and 913, which can increase the speed of processing.

In order to store the data 916 and 917 of 128 bytes from the memories 910, 911, 912 and 913 to the cache memories, the CPU 902 accesses the system controller 901 to read the memories. The system controller 901 creates the data 917 by copying the data 916. The data 916 and the data 917 are data having an identical description.

The CPU 902 accesses the system controller 901 at an address PA indicating all areas of many memory systems provided on the system. The system controller 901 uses an address lookup table 914 to convert the address PA to an address MA on the memory 910, which can be used by the memory controller 906 to memory access. The system controller 901 further converts the address PA to the MA and LIA by adding selection information on memories such that a memory can be selected from many memories (not shown) connected to the memory controller 906.

The data 916 of 128 bytes in the cache memory here is divided into divided data pieces 918 and 919 of 64 bytes each. Similarly, the data 917 of 128 bytes in the cache memory is divided into divided data pieces 920 and 921 of 64 bytes each. The memories 910, 911, 912 and 913 store the divided data pieces 918, 919, 920 and 921, respectively. The system controller 901 synchronously controls the four memory controllers 906, 907, 908 and 909, and the memory controllers 906, 907, 908 and 909 synchronously access the memories 910, 911, 912 and 913. Since the system controller 901 is a controller that controls memory access from the CPUs 902, 903, 904 and 905, it is more efficient to synchronously control commands to the memory controllers 906, 907, 908 and 909 and data exchange by one memory access. Thus, the speed of the processing can be increased.

The system controller 901 converts the addresses of the divided data pieces 918, 919, 920 and 921 of 64 bytes each in the storage section of the system controller 101 to addresses in the memory controllers 906, 907, 908 and 909. The system controller 901 performs the address conversion on the address PA subject to memory read with reference to the address lookup table 914. The system controller 901 transfers the converted address to the memory controllers 906, 907, 908 and 909.

Like the case of the Non-Mirror mode, an address packet has an ID and is managed under the ID. The address packet includes an address in the memory 910.

In an address packet 1201 transferred to the memory controller 906, the memory access interface 1102 extracts a command to memory access from a CMD 12012 and an address MA subject to memory access from an LIA 12013. Thus, memory read access is performed on the memory 910.

The memory 910 operates in accordance with a command from the memory controller 906. In accordance with a read command, the memory 910 divides a divided data piece of 64 bytes to those of 8 bytes each and transfers them to the memory controllers 906 at eight different times. Similarly, divided data pieces of 8 bytes each are transferred from the memories 911, 912 and 913 to the memory controllers 907, 908 and 909 at eight different times respectively.

The memory controller 906 transfers the divided data piece 918 of 64 bytes to the system controller 901. The memory controller 906 transfers the divided data piece 918 of 8 bytes each to the system controller 901 at eight different times. The memory controller 906 here adds the ID 12011, which is added to the already received address packet 1201, to the data packets to be transferred to the system controller 901. The system controller 901 compares the ID managed by itself and the ID 12011 and establishes a correspondence between the read command and the divided data piece 918. Similarly, the memory controller 907 transfers the divided data piece 919 of 64 bytes to the system controller 901. The system controller 901 connects the divided data pieces 918 and 919 to create the data 916 of 128 bytes. The system controller 901 transfers the data 916 to the CPU and stores it in the cache memory within the CPU. Similarly, the memory controllers 908 and 909 transfer the divided data pieces 920 and 921 of 64 bytes to the system controller 901. The memory controllers 908 and 909 transfer the divided data pieces 920 and 921 of 8 bytes each to the system controller 901 at eight different times. The memory controller 906 here adds IDs 12031 and 12041, which are added to the already received address packets 1202 and 1203, to the data packets to be transferred to the system controller 901. The system controller 901 compares the ID managed by itself and the IDs 12031 and 12041 and establishes a correspondence between the read command and the divided data pieces 920 and 921. The system controller 901 connects the divided data pieces 920 and 921 to create the data 917 of 128 bytes. The system controller 901 transfers the data 917 to the CPU and stores it in the cache memory within the CPU.

During the flow of the memory-read operation, an error detecting circuit 1103 in the memory controller 906 determines the presence of an error in the divided data piece 918. The presence of an error is determined specifically as follows. A detecting circuit 1104 first creates a check bit corresponding to the divided data piece 918. A memory access interface 1102 stores the check bit in the memory 910 along with the divided data piece 918. Then, the memory access interface 1102 reads the check bit and divided data piece 918 from the memory 910 and transfers them to the error detecting circuit 1103. The error detecting circuit 1102 then calculates the determination of the presence of an error in the divided data piece 918 by performing an Exclusive OR operation on the check bit and divided data piece 918.

The memory access interface 1102 records a memory read access in the memory controller 906 to the history memory 1101. Thus, a user can analyze a description recorded in the history memory and can identify the type of the memory access and the type of the exchanged data.

When the error detecting circuit 1103 detects an error in reading the divided data piece 918, the error detecting circuit 1103 transmits an error detection signal to an address controller 1105, which is an address managing circuit of the history memory 1101.

The address controller 1105 receives the error detection signal and then stops the operation of updating the history memory 1101.

In order to correct the data within the memory 910, the error detecting circuit 1103 having detected the read error in the divided data piece 918 commissions the system controller 901 to perform scrub-write processing. The system controller 901 having received the commission for the scrub-write processing transmits a scrub-write command to the four memory controllers 906, 907, 908 and 909. In order to synchronously control the four memory controllers 906, 907, 908 and 909, the system controller 901 transmits the scrub write command to all of the four memory controllers 906, 907, 908 and 909.

The memory controller 906 having received the scrub write command from the system controller 901 performs the scrub-write by a scrub controller within the history stop circuit 1106.

The history stop circuit 1106 receives the scrub write command and then transmits a history memory stop signal to the address controller 1105 to stop the history memory 1101 and stops address creation in the history memory 1101.

In the memory controller 906, the memory access interface 1102 records in the history memory 1101 an "ENTRY" which is a time interval of accesses on which the memory access interface 202 performs memory access control, a "CMD" which is a type of a memory access command, an "ADDRESS", which is an address where the memory access interface 202 performs memory access control, "DATA", which is data to write in the memory 110 or to read from the memory 110 by the memory access interface 202, and a "DATA Valid", which is a flag indicating that the memory access interface 202 has performed control over data writing to the memory 110 or control over data reading from the memory 110.

Similarly, the memory access interfaces of the memory controllers 907, 908 and 909 record in the respective history memories in the memory controllers 907, 908 and 908 an "ENTRY" which is a time interval of accesses on which the memory access interface performs memory access control, a "CMD" which is a type of a memory access command, an "ADDRESS", which is an address where the memory access interface performs memory access control, "DATA", which is data to write in the memory or to read from the memory by the memory access interface, and a "DATA Valid", which is a flag indicating that the memory access interface has performed control over data writing to the memory or control over data reading from the memory.

In the memory controller 906, when an error detecting circuit 1104 detects an error in the divided data piece 918, the error detecting circuit 1104 transfers the error detection signal as a history memory stop signal to the address controller 1105.

The address controller 1105 receives the error detection signal and then stops updating the history memory 1105. The error detecting circuit 1104 again transmits scrub write request commissioning information in a packet form to the system controller 901 through the history stop circuit 1106. The scrub write request commissioning information is information describing the commission for requesting processing of rewriting after error correction.

The system controller 901 receives the scrub write request commissioning information and then uses the scrub controller 914 to synchronously transmit the scrub write request information to the memory controllers 906, 907, 908 and 909. The memory controllers 906, 907, 908 and 909 receive the scrub write request signal by the respective history stop circuits. When the scrub write request information is received, the history stop circuits stop the processing of updating the history memories through the address controllers.

The memory controllers 906, 907, 908 and 909 can prevent updating processing histories in the respective history memories. Thus, the server 900 can refer to the data of 128 bytes upon occurrence of an error from the history memories of the memory controllers 106, 107, 108 and 109 and can analyze the error in detail. Since, in the Mirror mode, the divided data piece 918 and the divided data piece 920 are data having an identical description, the history table with an error and the history table without an error can be compared by comparing the "history table recorded in the history memory 1101" and the "history table recorded in the history memory of the memory controller 908". Thus, an error can be analyzed even if the error is an error uncorrectable by the error detecting circuit.

FIG. 13 shows a history table 1300. The history table 1300 has items of "ENTRY 1301", "CMD 1302", "ADDRESS 1303", "DATA 1304", "DATA Valid 1305".

The "ENTRY 1301" is a "time interval of accesses when the memory access interface 1102 performs memory access control". The "CMD 1302" is a "type of a memory access command". The "ADDRESS 1303" is an "address where the memory access interface 1102 performs memory access control". The "DATA 1304" is "data to write in the memory 910 or to read from the memory 910 by the memory access interface 1102". The "DATA Valid 1305" is a "flag indicating that the memory access interface 1102 has performed control over data writing to the memory 110 or control over data reading from the memory 910".

Similarly, FIG. 14 shows a history table 1400. The "ENTRY 1401" is a "time interval of accesses when the memory access interface 1102 performs memory access control". The "CMD 1402" is a "type of a memory access command". The "ADDRESS 1403" is an "address where the memory access interface 1102 performs memory access control". The "DATA 1404" is "data to write in the memory 910 or to read from the memory 910 by the memory access interface 1102". The "DATA Valid 1405" is a "flag indicating that the memory access interface 1102 has performed control over data writing to the memory 910 or control over data reading from the memory 910".

When the amounts of the history tables 1300 and 1400 are equal to or larger than the capacity of the history memory 901, the history memory 901 is configured to delete an old history and overwrite a new history.

The processing to be controlled by control means in the present invention is included in processing to be performed by the system controllers 101 and 901 in the embodiments. The processing to be performed by storage means in the invention is included in processing to be performed by the memories 110, 111, 112, 113, 910, 911, 912 and 913 in the embodiments. The processing to be controlled by storage control means in the present invention is included in processing to be performed by the memory controllers 106, 107, 108, 109, 906, 907, 908 and 909 in the embodiments. The processing to be performed by history storage means in the present invention is included in processing to be performed by the history memories 201 and 901 in the embodiments. The processing to be performed by error detecting means in the present invention is included in processing to be performed by the error detecting circuits 203, 204, 903 and 904 in the embodiments. The processing to be controlled by error correction signal generating means in the present invention is included in processing to be performed by the scrub controllers in the embodiments. The processing to be performed by history stop means in the present invention is included in processing to be performed by the address controllers in the embodiments.

What is claimed is:

1. An information processing apparatus comprising:
a system controller configured to divide data into a plurality of divided-data;
a plurality of storage units configured to store the plurality of divided-data, respectively; and
a plurality of storage controllers configured to write the divided-data into corresponding storage units or reading out the divided-data from the corresponding storage units,
each storage controller including:
a history storage unit configured to store histories of an operation of the corresponding storage controller, memory addresses being created in correspondence with the histories;
an error detector configured to detect an error in the divided-data; and
a history controller configured to control an update of the histories in the corresponding history storage units, and
a scrub controller configured to control an operation of correcting and rewriting the divided-data after reading from a memory address among the memory addresses that is same as a memory address having an error, when one of the plurality of storage controllers detects a memory error, and wherein history controllers of the plurality of storage controllers are synchronously controlled based on a signal to stop the update of the histories in the plurality of storage units when the error detector of at least one of the storage controller detects the error, and the histories prior and subsequent to the detection of the error in the plurality of storage units are compared to analyze the error.

2. The information processing apparatus according to claim 1, comprising:

an error correction controller for synchronously transmitting a plurality of error correction signals indicative of controlling correction of the error to the respective history controllers.

3. The information processing apparatus according to claim 1, wherein the controller creates the divided-data redundantly.

4. The information processing apparatus according to claim 1, wherein the controller manages a plurality of addresses of the divided-data in the storage unit.

5. The information processing apparatus according to claim 4, wherein the controller uses an address lookup table to manage the addresses of the divided-data in the controller and the addresses of the divided-data in the storage unit by establishing correspondences therebetween.

6. The information processing apparatus according to claim 1, wherein the history storage unit deletes a stored history in order from the oldest one and overwrites a new history.

7. A history management method comprising:

dividing data into a plurality of divided-data;

storing the plurality of divided-data in a plurality of storage units, respectively;

writing the divided-data into a corresponding storage unit or reading out the divided-data from the corresponding storage unit;

storing histories of an operation of writing or reading the divided-data into a plurality of history storage units, each of the plurality of history storage units being associated with one of the plurality of storage units and memory addresses being created in correspondence with the histories;

detecting an error in the divided-data;

controlling an update of the histories in the history storage units; and correcting and rewriting the divided-data after reading from a memory address among the memory addresses that is same as a memory address having an error, when one of the plurality of storage units detects a memory error, wherein the update of the histories in the plurality of history storage units is synchronously controlled based on a signal to stop the update when the error is detected in the divided-data corresponding to one of the storage units and the histories prior and subsequent to the detection of the error in the plurality of storage units are compared to analyze the error.

8. A history management method, comprising:

storing histories of a writing or reading operation of a plurality of divided-data into a plurality of history storage units, each of the plurality of history storage units being associated with one of a plurality of storage units and memory addresses being created in correspondence with the histories;

synchronously stopping an update to histories in each of the history storage units, based on a signal, when detecting an error in a piece among said plurality of divided-data in one of the storage units; and correcting and rewriting the divided-data after reading from a memory address among the memory addresses that is same as a memory address having an error, when one of the plurality of storage units detects a memory error, and wherein the histories of the history storage units prior and subsequent to the detection of the error are compared to analyze the error.

* * * * *